United States Patent [19]

Morgan

[11] Patent Number: 4,501,054

[45] Date of Patent: Feb. 26, 1985

[54] HAND TOOL FOR INSTALLING COMPRESSION RINGS ON RADIAL POSITIONING DEVICES

[75] Inventor: Thomas A. Morgan, Billerica, Mass.

[73] Assignee: Honeywell Information Systems Inc., Waltham, Mass.

[21] Appl. No.: 537,304

[22] Filed: Sep. 29, 1983

[51] Int. Cl.³ .............................................. B23D 19/02

[52] U.S. Cl. ........................................ 29/235; 29/229; 29/278

[58] Field of Search ................. 29/225, 229, 235, 278, 29/280

[56] References Cited

U.S. PATENT DOCUMENTS

| | | | |
|---|---|---|---|
| 3,010,193 | 11/1961 | Croall et al. | 29/278 |
| 3,222,766 | 12/1965 | Camargo | 29/278 |
| 3,393,439 | 7/1968 | Shriver | 29/235 |
| 4,205,435 | 6/1980 | Holt | 29/235 |

*Primary Examiner*—James L. Jones, Jr.
*Attorney, Agent, or Firm*—Faith F. Driscoll; Nicholas Prasinos

[57] ABSTRACT

A hand held tool for installing compression rings includes a pair of relatively reciprocable coaxial cylindrical independently spring biased elements housed within a cylindrical handle which includes mode control means automatically preconditioned for enabling the tool to perform either an installation or ejection operation. The mode control means includes a cylindrical radial cavity containing plural spring biased spherical ball detents and extends into corresponding portion of the outer reciprocable element. The positioning of a tapered central section of the inner reciprocable element coincides with the cavity so that one of the spherical ball detents normally sits within a hollow defined by the taper. When one spherical ball detent, in response to the mode control means being preconditioned by depressing a front end or shaft portion of the inner element, is positioned to lock the outer member to the handle, this allows the ring to be installed onto the cam shaped front end of the outer element. In the absence of such preconditioning, one ball detent is positioned so that its outermost surface coincides with the outer surface of the outer element allowing the cam shaped front end to recede into the handle so that the installed ring can be ejected onto the device on which it is to be mounted.

30 Claims, 14 Drawing Figures

HAND TOOL FOR INSTALLING COMPRESSION RINGS ON RADIAL POSITIONING DEVICES

BACKGROUND OF THE INVENTION

This invention pertains to a hand tool and more particularly to a hand tool for installing and ejecting compression rings onto radial positioning devices which are utilized with electronic or electrical equipment.

It has been found that it is very difficult to install compression rings onto radial positioning devices or knobs used on knob-to-shaft assemblies found in electronic or electrical equipment. The reasons are that such rings are spring loaded and that the device onto which they are to be installed is generally recessed or flush which inhibits hand operation, installation or access.

Generally, the most common way of installing compression rings is by using hand tools such as needle nose pliers. This method of installation has been found not only very time consuming, but dangerous to an operator's safety.

One manufacturer has proposed the use of a hand tool consisting of two separate pieces. A first shaft piece is used by an operator to mount the compression ring thereon as a first operation. The operator is then required to carry out a second operation in which the shaft piece is withdrawn or pressed into a second piece in which it is housed causing the compression ring to be ejected onto the knob.

It has been found that with this type of hand tool, it is difficult to manually position the ring so that it can be successfully mounted on the knob. If improperly positioned, the operator would be required to repeat the entire procedure. Thus, considerable time is required to be expended by an operator. Moreover, the hand tool requires several operations to be performed in order to complete the installation of a compression ring. Further, this type of hand tool does not provide a reliable means of installing compression rings onto knob to shaft assemblies.

Accordingly, it is an object of the present invention to provide a new improved hand tool which operates reliably and is convenient to use and operate.

It is a further object of the present invention to provide a hand tool which requires a minimum amount of steps in completing the installation of compression rings or the like.

SUMMARY OF THE INVENTION

The above and other objects of the present invention are achieved in a preferred embodiment of the hand tool of the present invention which comprises plural relatively reciprocable coaxial cylindrical elements housed within a hollow cylindrical handle which includes mode control means which is automatically preconditioned for enabling the tool to perform either an installation or ejection operation. Both coaxial reciprocable elements are independently spring biased by compression springs contained within a cavity included in the handle member.

The mode control means includes a cylindrical radial cavity which extends into a portion of an adjacent wall of the outer reciprocable hollow element. The radial cavity contains plural spring biased spherical ball detents which operate radially within the cavity and carry out the preset function.

The inner reciprocable element has a central cylindrical section which contains a taper or undercut section. This section is longitudinally positioned to coincide with the radial cavity and tapered to a predetermined depth so that the outer surface of the spherical ball detent closest to the inner reciprocable element coincides with the outer diameter of the outer reciprocable element.

The front end or shaft portion of the inner reciprocable element extends beyond the front portion of the handle and outer reciprocable element to fit anywhere within the inside diameter of the compression or snap ring which is to be mounted on the radial positioning or knob device. This element performs a plurality of functions which include picking up the snap ring, automatically preconditioning or presetting the mode control means and automatically aligning the snap ring with the knob device on which it is to be mounted.

In operation, when one spherical ball detent is positioned to lock the outer reciprocable member to the handle in response to the mode control means being preset by depressing the shaft portion of the inner reciprocable element, this allows the ring to be installed onto the cam or wedge-shaped front end of the outer reciprocable element. However, in the absence of such preconditioning, one ball detent is positioned so that its outermost surface coincides with the outer diameter surface of the outer element so that both reciprocable elements are locked together to move longitudinally. This allows the cam-shaped front end to recede into the handle so that the installed ring can be ejected onto the radial positioning device on which it is to be mounted. The ejection is accomplished by a front portion of the handle which slides the ring off the cam surface of outer reciprocable element onto the knob device.

From the above, it is seen that the hand tool of the present invention permits the installation of a snap ring onto the knob device to be accomplished without requiring that an operator handle or touch the ring. This ensures operator safety in that no hand injury can result.

Further, the hand tool eliminates the need for an operator to expend considerable time in aligning or positioning the snap ring when it is mounted onto the knob device. Moreover, since the hand tool of the present invention is operated using only one hand, the operator's other hand is left free to position the knob device as desired.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
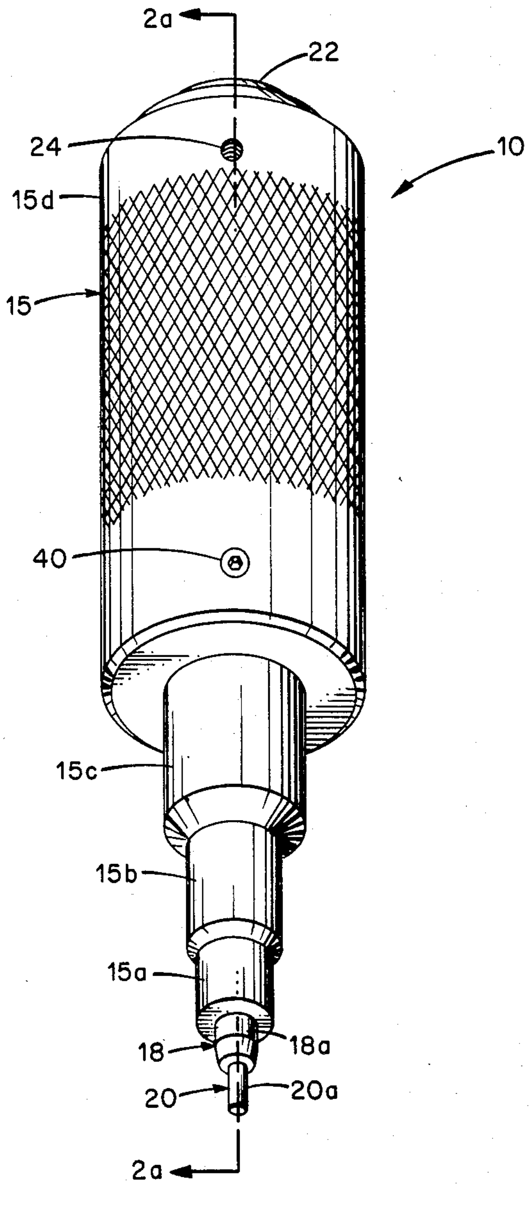
FIG. 1 is a perspective view illustrating the hand tool of the preferred embodiment of the present invention.

The construction of the preferred embodiment of the compression ring hand tool 10 of the present invention will now be described with reference to FIGS. 1 through 5b. Referring to FIG. 1, it is seen that the tool 10 has a hollow shaped handle 15 constructed to have a number of cylindrical sections 15a through 15d of different diameters. As shown, diameters of the front, middle and rear sections 15a through 15d respectively successively decrease in size as shown in FIG. 1. This allows an operator to view the compression or snap ring during both installation and ejection operations. Also, a portion of the outer surface of handle section 15d is knurled for positive handling.

The tool 10 further includes a pair of coaxial cylindrical reciprocal elements 18 and 20 which pass through a cylindrical opening of front handle section 15a. The opposite end of handle 15 is closed by means of a removable cap 22 held in place by three threaded set screws 24 radially positioned as shown.

The outer coaxial reciprocal element 18 has an outer diameter which is slightly larger (e.g. 0.28 inches) than the inner diameter of the compression rings (e.g. 0.203 inches) to be mounted onto the knob devices. These compression rings are conventional in design and take the form of the single piece spring steel rings typically manufactured by Eaton Corporation.

The exposed front end or collar portion 18a of the outer coaxial reciprocal element 18 is cam or wedge shape to facilitate installation of the compression ring onto tool 10 as explained herein. The exposed front end or shaft portion 20a of inner coaxial reciprocal element 20 diameter and length dimensions are selected so that shaft portion 20a easily fits anywhere within the inside diameter of the compression ring to be mounted (e.g. diameter = $\frac{1}{8}$" and length = $\frac{3}{8}$"). Also, these dimensions are in conformity with the compression ring and the knob device on which the ring is to be mounted.

Figure 2A:
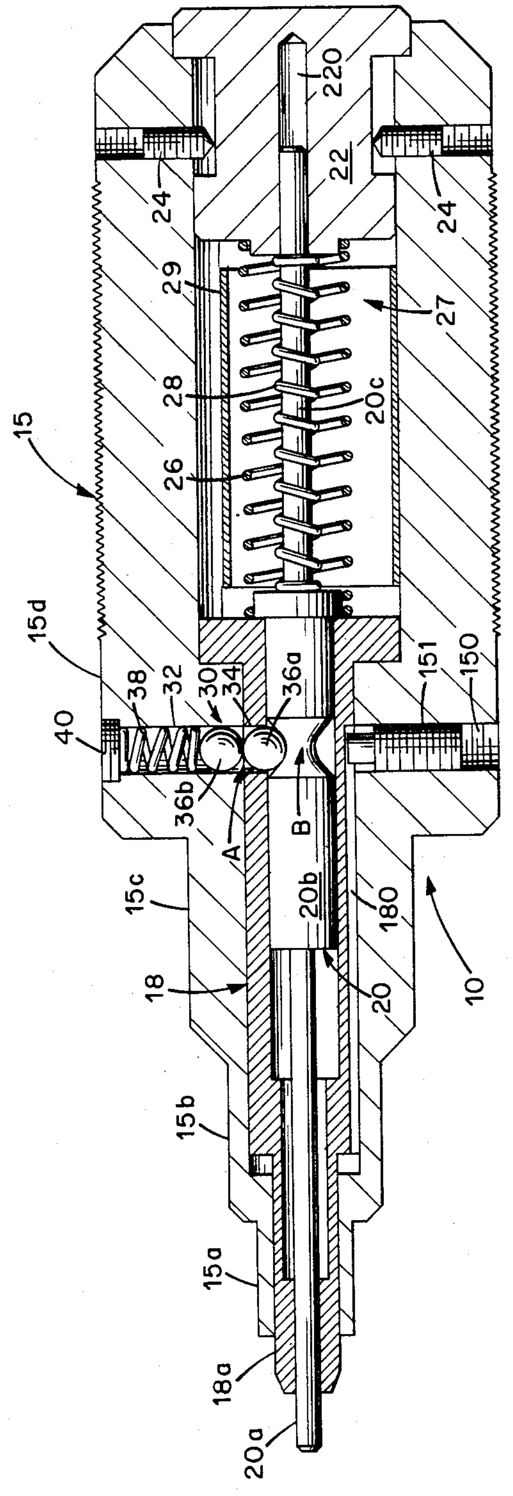
FIGS. 2*a* through 2*c* are enlarged cross-sectional views of the hand tool of FIG. 1 taken along axis 2*a*—2*a*.
Figure 2B:
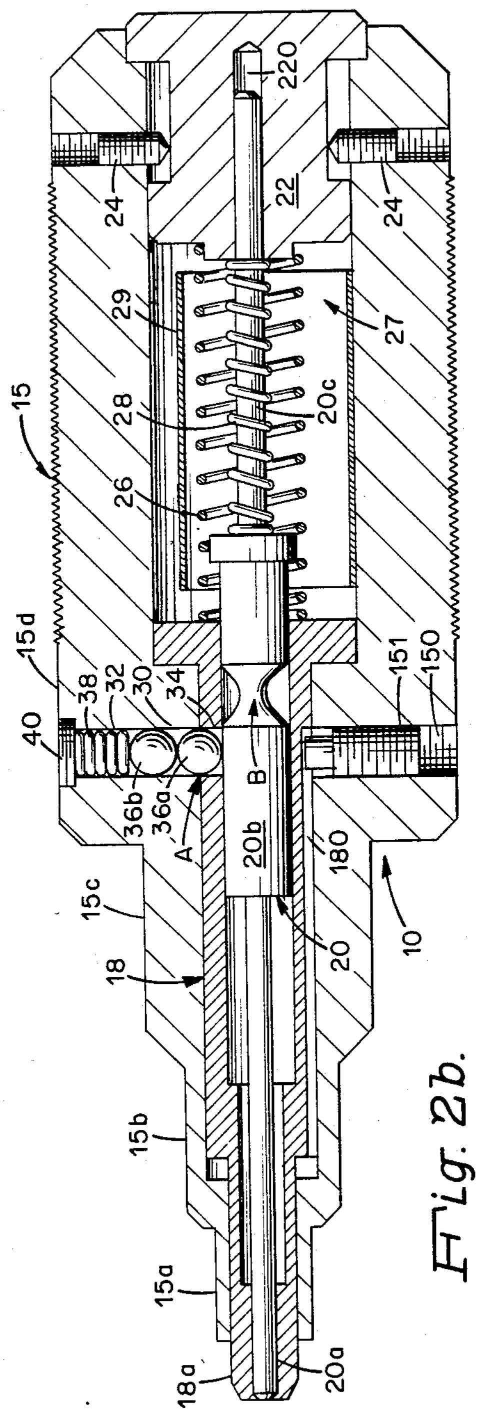
Figure 2C:
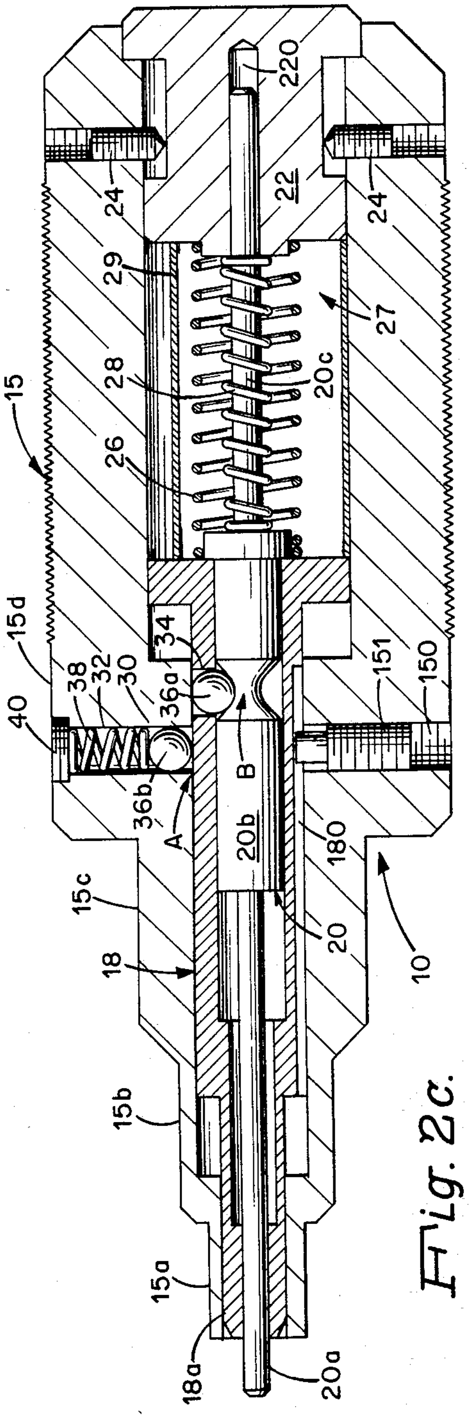

FIG. 2a is a cross-sectional view of tool 10 taken longitudinally along the axis 2a—2a showing the construction of its three major components, handle 15, and coaxial reciprocal elements 18 and 20 when placed in a rest position. The FIGS. 2b and 2c are similar cross-sectional views showing the positioning of the tools' major components when placed in different operational modes. These Figures will be referenced in regard to explaining the operational aspects of tool 10.

As seen from FIG. 2a, reciprocable element 18 has two cylindrical sections 18a and 18b of increasing diameters. Reciprocable element 20 has two other cylindrical sections 20b and 20c. Both coaxial reciprocable elements 18 and 20 are independently spring biased by compression springs 26 and 28, respectively. These springs are housed within a cavity 27 of handle section 15d, as shown. As seen from FIG. 2a, cavity 27 further includes a hollow cylindrical spacer 29 constructed of aluminum material. The spacer 29 which moves freely within cavity 27 serves as a stop for reciprocal element 18. That is, spacer 29 prevents the front end of section 18a of reciprocable element 18 from receding past the front end of handle section 15a. The springs 26 and 28 are conventional helical wound compression springs.

In accordance with the principles of the present invention, tool 10 further includes mode control means 30 which is automatically preconditioned or preset by the shaft portion 20a of reciprocable element 20 for enabling the tool 10 to perform either an installation or ejection operation. In the preferred embodiment, mode control means 30 includes a cylindrical radial cavity 32 within handle 15. As shown, cavity 32 extends through a corresponding portion of the cylindrical wall 34 of reciprocable element 18. Compression spring 26 biases reciprocable element 18 so that the extended portion of the cavity 32 encompassing element 18 is properly or radially aligned with the major portion of the cavity included within section 15d of handle 15 as shown in FIG. 2a.

Mode control means 30 further includes a pair of spherical ball detents 36a and 36b which are biased by a further helical wound compression spring 38 in the position shown in FIG. 2a. The compression spring 22 is held or contained within the cylindrical radial cavity 38 by a threaded set screw 40.

The spherical ball detents 36a and 36b are constructed of steel material and have a diameter which is slightly smaller than the diameter of cavity 38. The ball detents are conventional in design.

When tool 10 is in the rest position, spherical ball detent 36a is positioned so that its outermost surface coincides with the outer diameter surface of reciprocable element 18. This corresponds to point A. When so positioned, both reciprocable elements 18 and 20 are allowed to move longitudinally within handle 15.

In addition to the above, a middle or central section 20b of reciprocable element 20 is constructed to have a taper or undercut portion B. The portion B is longitudinally positioned by compression spring 28 to coincide with radial cavity 32. The tapered portion B is undercut or tapered to a depth so as to have the outermost surface of ball detent 36a coincide with the outer diameter surface of element 18 at point A as discussed above.

As seen from FIG. 2a, a right or end section 20c of reciprocable element 20 has length and diameter dimensions which allow it to move freely within a cylindrical cavity 220 included in removable cap 22. Compression spring 28 which is wound around section 20c also biases reciprocable element 20 so that when tool 10 is at rest, only the small portion of section 20c shown extends into cavity 220.

Additionally, section 15d of handle 15 includes a further cylindrical radial cavity 150 opposite cavity 32 which contains a "dog point" threaded set screw 151 for radially orienting reciprocable element 18 with handle 15. That is, it provides exact adjustment of the axial position of reciprocable element 18 with cavity 32. The set screw 151 fits into an elongated longitudinal slot 180. This slot extends from the outer diameter of cavity 180 to the end of a second cylindrical section 18b of reciprocable element 18 as shown. When set screw 151 is tightened so that its cylindrical point properly contacts the sides of slot 180, it inhibits reciprocable element 18 from turning or rotating within handle 15. Accordingly, reliable operation is assured by inhibiting any possibility of misalignment of the tool's components through continuous use.

Figures 3A, 3B, 4A, 4B, 5A, 5B:
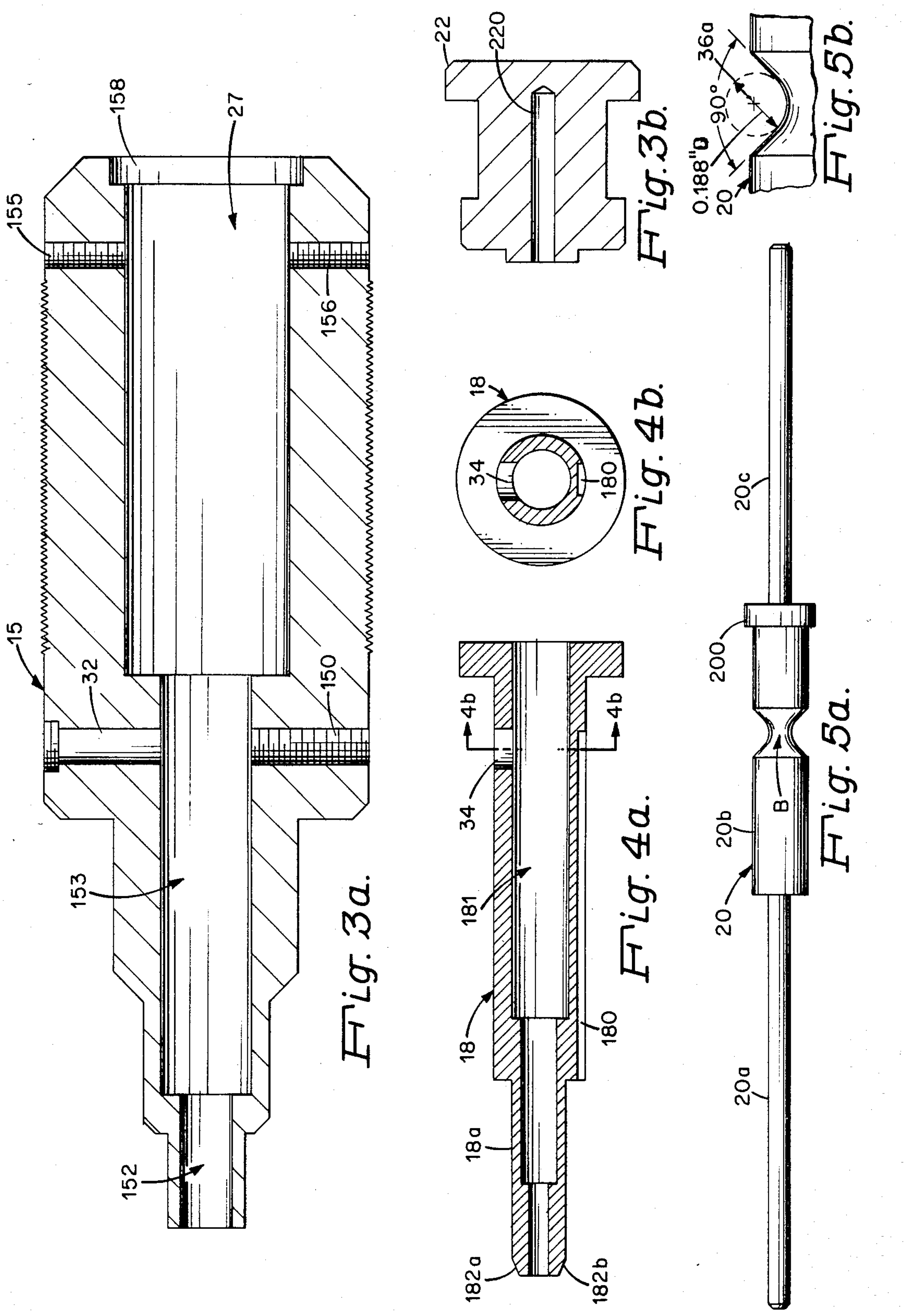
FIGS. 3*a* and 3*b* are enlarged cross-sectional views of the handle pieces of the hand tool of FIG. 1 constructed according to the teachings of the present invention.
FIGS. 4a and 4b are enlarged cross-sectional views of one cylindrical reciprocable element of the tool of FIG. 1 constructed according to the teachings of the present invention.
FIGS. 5a and 5b are enlarged cross-sectional views of another cylindrical reciprocable element of the tool of FIG. 1 constructed according to the teachings of the present invention.

FIG. 3*a* is an enlarged cross-sectional view of the handle 15 showing in greater detail, cavities 27, 32 and 150 discussed above. Additionally, the handle 15 includes hollow cylindrical cavities 152 and 153 which contain or house reciprocable elements 18 and 20. Two of the three radial cavities are located as shown for insertion of set screws 24 which hold cap 22 in place. Lastly, a further cylindrical 158 cavity is used to contain removable cap 22. In the preferred embodiment, the handle 15 is made from aluminum material.

FIG. 3*b* is an enlarged cross-sectional view of removable cap 22 which shows in greater detail cylindrical cavity 220. The cap 22 is key-like in shape as shown to fit within handle 15. As mentioned, cavity 220 provides sufficient space required for accommodating the longitudinal motion of reciprocable element 20. The left end of cap 22 has a raised boss or protrusion as shown which provides a base support for compression spring 28. In the preferred embodiment, the cap 22 is constructed from aluminum material.

FIG. 4*a* is an enlarged cross-sectional view of outer reciprocable element 18. As shown, reciprocable element 18 has a single cylindrical cavity 181 which extends its entire length. The cylindrical cavity 181 is stepped as to have three different size diameters as shown. The diameter of the opening at the left is slightly larger than the outside diameter of shaft portion 20*a* of reciprocable element 20.

FIG. 4*a* illustrates the cam or wedge-like shape of each of the front end surfaces 182*a* and 182*b* of section 18*a*. This facilitates the installation of compression rings onto the tool.

As seen from FIG. 4*a*, the radial cavity 38 extends completely through a portion of the top wall of reciprocable element 18 as indicated. The extended cavity area 34 through the top wall, as well as elongated longitudinal slot 180, are shown in greater detail in FIG. 4*b*. As indicated, FIG. 4*b* is an enlarged cross-sectional view taken along the axis 4*b*—4*b*. In the preferred embodiment, sections 18*a* and 18*b* of reciprocable element 18 are constructed of brass material.

FIG. 5*a* is an enlarged cross-sectional view of the three section inner reciprocable element 20. The cylindrical sections 20*a*, 20*b* and 20*c* are constructed of steel material. The tapered portion B of section 20*b* is tapered to have the same radius as spherical ball detent 36*a* as shown in FIG. 5*b*. The cylindrical base or flange 200 at the end of section 20*b* provides a base support for compression spring 28. Its diameter is small enough so as not to interfere with the action of compression spring 26.

DESCRIPTION OF OPERATION

Figure 6A:
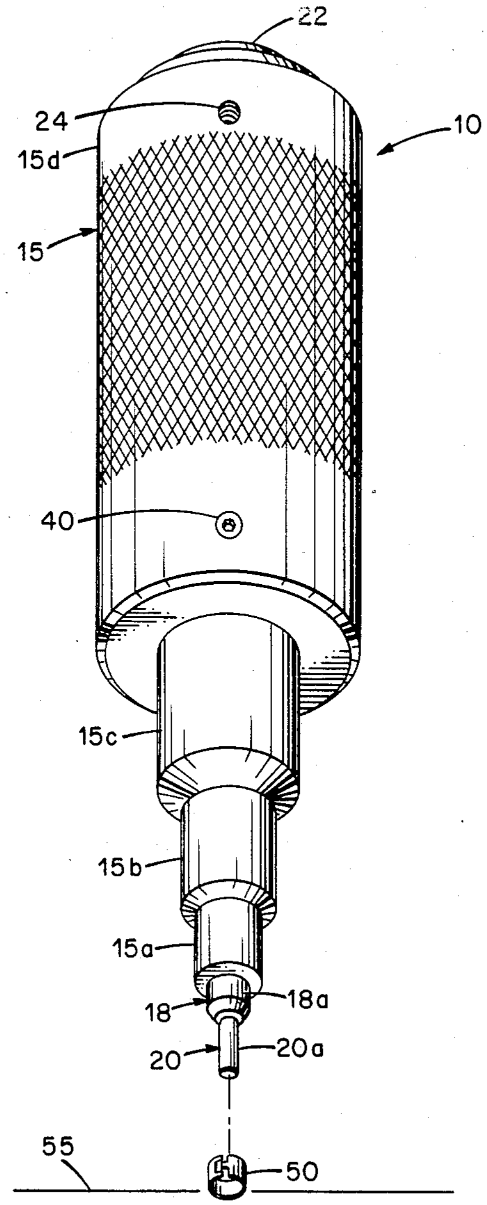
FIGS. 6a through 6d illustrate the method of mounting a compression ring onto a knob device using the hand tool of FIG. 1.

With reference to FIGS. 2*a* through 2*c*, the operation of tool 10 will now be described in carrying out the installation and ejection operations pictorially illustrated in FIGS. 6*a* through 6*d*. Referring to FIG. 6*a*, it is seen that an operator holding tool 10 in one hand places the shaft portion 20*a* into the inside diameter of compression ring 50 which is lying on a work surface 55.

At this time, the major components of tool 10 are in a rest position as shown in FIG. 2*a*. That is, the reciprocable elements 18 and 20 are positioned so that the top wall of element 18 is aligned to have the extended cavity area 34 of the top wall coincide with the major portion of cavity 32 and to have spherical ball detent 36*a* seated in the hollow space of the tapered portion B of element 20 as shown (i.e., outermost surface tangent to point A).

Figure 6B:
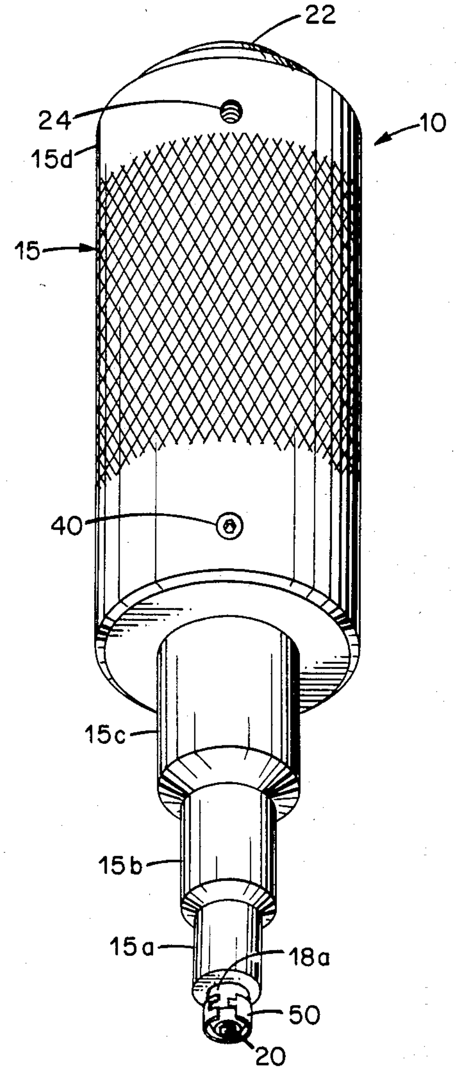

When the operator presses down on the handle 15, this causes shaft portion 20*a* to move or recede into handle 15. This motion continues until shaft portion 20*a* has receded completely into handle 15 as shown in FIG. 6*b*. As the shaft portion 20*a* is withdrawn into reciprocable element 18 and handle 15, the tapered portion B of element 20 moves longitudinally to the right causing spherical ball detent 36*a* to move radially into radial cavity 32 along the path defined by the angle of tapered portion B.

Thus, when the shaft portion 20*a* is completely withdrawn, sperical ball detent 36*a* is positioned to lock reciprocable element 18 to handle 15 preventing its further longitudinal movement. At this time, the major components of tool 10 are positioned as shown in FIG. 2*b*. That is, spherical ball detent 36*a* is positioned so that its diameter approximately coincides with point A while at the same time, spherical ball detent 36*b* has been moved vertically, as shown. Additionally, the tapered portion B of element 20 is now positioned to the right of cavity 32, as shown.

When so positioned, this allows the compression ring 50 to be spread open by the cam or wedge-shaped front end of section 18*a* of element 18 as the operator presses down further on handle 15. This, in turn, forces by cam action, the front end of section 18*a* into the inside diameter of compression ring 50. The result is that compression ring 50 has been mounted onto the exposed front end of element 18*a* as shown in FIG. 6*b*. It is held in place by the spring tension of compression ring 50. As soon as the operator lifts tool 10 above surface 55, compression springs 26 and 28 automatically return reciprocable elements 18 and 20 to their rest positions of FIG. 2*a*.

Figure 6C:
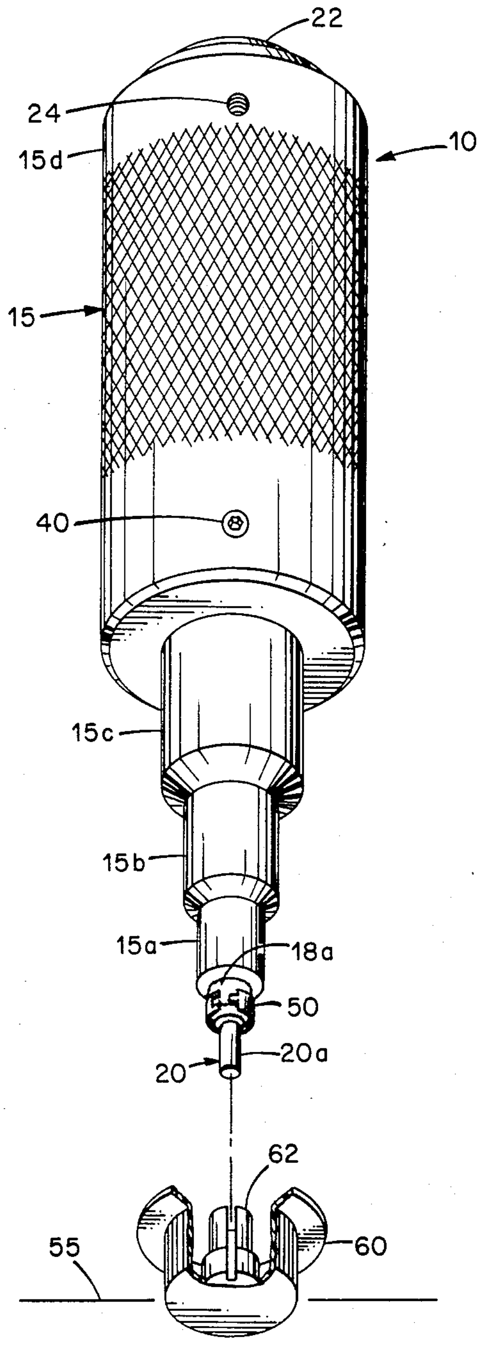

Next, the operator using the shaft portion 20*a* of reciprocable element as a guide places shaft portion 20*a* into the area where compression ring 50 will be mounted as shown in FIG. 6*c*. More particularly, referring to FIG. 6*c*, it is seen that the operator places shaft portion 20*a* into the opening in the boss or hub portion 62 of the knob device 60. That is, the inside of the knob device 60 is hollowed out except for a raised boss or hub 62 located in the center of the inside part of knob 60. The knob device 60 is conventional in design.

Figure 6D:
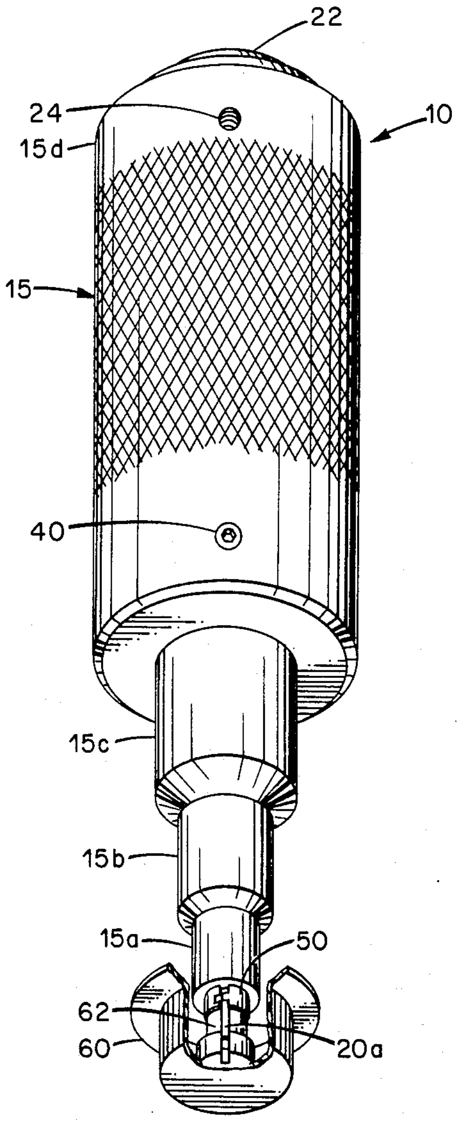

A section of the knob device 60 has been cut away to more clearly illustrate how the ejection operation is accomplished. When tool 10 is so placed, it is seen that the front end of section 18*a* of reciprocable element 18 comes into contact with the boss or hub portion 62. As the operator presses handle 15 down, section 18*a* of reciprocable element 18 recedes into handle 15 until its movement within cavity 27 is restricted by spacer 29 (i.e., spacer 29 aligns the front edge of Section 18*a* with the front edge of handle section 15*a* as shown in FIG. 2*c*). This allows the front section 15*a* of handle 15 to eject or slide compression ring 50 onto the hub portion 62 of knob device 60 as shown in FIG. 6*d*.

At this time, the major components of tool 10 are positioned as shown in FIG. 2*c*. Since shaft portion 20*a* was not depressed, mode control means 30 was not preconditioned to operate in the mode shown in FIG. 2*b*. By contrast, depressing handle 15 causes both reciprocable elements 18 and 20 to move longitudinally within handle 15 from the rest postion of FIG. 2*a* to the right of cavity 32 as shown in FIG. 2*c*. As discussed above, this occurs because spherical ball detent 36a is positioned so that its outermost surface coincides with the outer diameter of reciprocable element 18. When in this position, both reciprocable elements 18 and 20 are locked together to move longitudinally to the positions shown in FIG. 2*c*. This results in the ejection of compression ring 50 onto hub 62 as shown in FIG. 6*d*.

From the foregoing, it is seen how the hand tool of the preferred embodiment of the present invention permits an operator to install a compression ring 50 onto the hub of the knob device 60 without having to handle or touch the ring. An operator can easily align or position the hand tool with one hand for mounting the ring 50 onto hub 62 while using the other hand to position the knob device 60 as desired.

Because of the above ease of use, an operator can install a substantial number of compression rings within the same time it took to install a single compression ring. Thus, the hand tool significantly improves an operator's productivity while maximizing the operator's safety.

Those skilled in the art will appreciate that many changes may be made to the tool of the preferred embodiment without departing from its teachings. For example, the dimensions of the tool's major components may be altered to accommodate different size compression rings. That is, by altering or making adjustments in the dimensions of the front portion or end of section 18a of element 18 and the front portion of section 15a of handle 15 in the appropriate proportions, the tool can be used for installing any type of compression ring. In all cases, the ratio of the dimensions of sections 18a and 15a would remain the same. It will also be obvious to those skilled in the art that spacer 29 could be incorporated as part of removable cap 22 or as part of reciprocable element 18.

Additionally, the front portions of both sections 15a and 18a can be made removable by replacing these sections with threaded sections which screw onto the other parts of the same sections of elements 15, 18 and 20. Thus, a single tool could be used to install a number of different size compression rings.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A hand tool for installing compression rings on radial positioning devices, said tool comprising:

a pair of reciprocable coaxial cylindrical shaped elements, a first outer element having a cam shaped front section and a second inner element having a plurality of sections, a first section having a shaft section which extends beyond said cam shaped front section positionable within said rings and a second section having a tapered portion; and, a hollow handle member having a longitudinal cylindrical cavity with an opening at one end, said reciprocable coaxial elements being slidably mounted in said cavity so that both front sections extend through said opening and the other end of said elements being independently spring biased, said handle member further including mode control means located transverse to said longitudinal cavity and including a portion of said first reciprocable element, said shaft section when depressed into said handle member preconditioning said mode control means for locking of said first element onto said handle member enabling said rings positioned by said shaft section to be installed onto said front section and said mode control means in the absence of said preconditioning, locking said first and second reciprocable elements together for ejecting said rings onto said devices when said shaped front section is depressed into said handle member.

2. The hand tool of claim 1 wherein said tool further includes first and second compression spring means and wherein said plurality of sections of said second reciprocable element includes a rear section, said first spring means encompassing both said rear section for biasing said second reciprocable element and said second spring means encompassing said rear section and said first spring means for independently biasing said first reciprocable element.

3. The hand tool of claim 2 wherein said handle member further includes a removable cap, said cap including a cylindrical cavity, said cap being inserted within said longitudinal cavity so that said cylindrical cavity couples directly to said longitudinal cavity and said rear section of said second reciprocable element can move longitudinally within both of said cavities.

4. The hand tool of claim 2 wherein said tool further includes a cylindrical hollow spacer element having a predetermined length, said spacer element being positioned to encompass said first and second spring means enabling their independent movement and for stopping the longitudinal movement of said first reciprocable element at a predetermined point.

5. The hand tool of claim 1 wherein said mode control means includes:

a first radial cavity located transverse to said longitudinal cavity and extending through an opening in a wall of said first reciprocable element adjacent to said first cavity; and, at least a pair of spring biased spherical ball detents, said detents being positioned so that one of said detents sits at the bottom of a hollow defined by said tapered portion of said second element second section when said tool is at rest so that its outmost surface coincides with the other surface of said first reciprocable element.

6. The hand tool of claim 5 wherein said tapered portion of said second section is contoured so that said mode control means in response to being preconditioned by said shaft section of said second reciprocable element results in said one of said detents being displaced radially within said radial cavity by the longitudinal movement of said tapered position for said locking of said first reciprocable element onto said handle member.

7. The hand tool of claim 6 wherein for said locking, one of said detents is positioned within said portion of said wall of said portion of said first reciprocable element adjacent to said radial cavity and a portion of said cavity in said handle member.

8. The hand tool of claim 5 wherein said mode control means in the absence of being preconditioned by said shaft section, results in said one of said detents being positioned at said bottom of said hollow in said tapered portion for said locking of said first and second reciprocable elements together so that when moved longitudinally a front section of said handle member slides said rings off said cam shaped portion of said first reciprocable element onto said devices.

9. The hand tool of claim 8 wherein said tapered portion has a radius which is the same as the radius of said one of said detents.

10. The hand tool of claim 5 wherein a portion of said first reciprocable element includes an elongated horizontal slot and wherein said handle member further includes:

a second radial cavity positioned opposite said first radial cavity and set screw means having a cylindrical shaped point, said screw means being positioned within said cavity to make contact with said slot so as to maintain proper positioning of said first reciprocable element relative to said first radial cavity.

11. The hand tool of claim 5 wherein said shaft section of front section of said second reciprocable element has a predetermined width and length for ease of positioning anywhere inside said compression rings.

12. The hand tool of claim 5 wherein said shaft section of said first reciprocable element has a predetermined width and length selected for retaining said rings installed on said tool.

13. The hand tool of claim 12 wherein said front section of said first reciprocable element has a wedge-shaped front edge for ease of installation of said rings on said tool.

14. The hand tool of claim 5 wherein said front sections of said first and second reciprocable elements have widths and lengths which have predetermined ratios to each other, said ratios being the size of defined by said compression rings being installed on said devices.

15. The hand tool of claim 14 wherein said front sections of said first and second reciprocable elements and a front portion of said handle member are constructed to be removable for enabling said tool to be used for installing different size compression rings.

16. The hand tool of claim 5 wherein said mode control means further includes spring means and set screw means, said spring means and said set screw means being inserted into said first radial cavity for adjustably biasing said pair of spherical ball detents for proper positioning within said hollow defined by said tapered portion of said second reciprocable element.

17. The hand tool of claim 1 wherein said first reciprocable element is constructed from brass material, said second reciprocable element is constructed from steel material and said handle member is constructed from aluminum material.

18. A hand tool for installing compression rings on radial positioning devices, said tool comprising:

a number of reciprocable coaxial cylindrical means, a first outer one of said number of means having a front section and a second inner one of said number of means having a shaft portion extending beyond said cam shaped front section and a tapered inner section; and hollow handle means having a longitudinal cylindrical cavity with an opening at one end, said reciprocable coaxial means being slidably mounted in said cavity so that said front sections extend through said opening and said means being independently spring biased, said handle member further including mode control means located transverse to said longitudinal cavity and coupled to extend into said first one of said reciprocable means, said shaft portion when depressed into said handle member preconditioning said mode control means for locking of said first means onto said handle member for installing said rings onto said tool and said mode control means in the absence of said preconditioning, locking said first and second reciprocable elements together for enabling said rings to be ejected from said tool onto said devices.

19. The hand tool of claim 18 wherein said tool further includes first and second compression spring means and wherein said second reciprocable means includes a rear section, said first spring means encompassing said rear section for biasing said second reciprocable means and said second spring means encompassing both said rear section and said first spring means, for independently biasing said first reciprocable element.

20. The hand tool of claim 19 wherein said handle member further includes a removable cap, said cap including a cylindrical cavity, said cap being inserted said longitudinal cavity so that said rear section of said second reciprocable means is able to move longitudinally within both of said cavities.

21. The hand tool of claim 18 wherein said mode control means includes:

first radial cavity means located transverse to said longitudinal cavity and extending through an opening in a wall of said first reciprocable means element adjacent to said first cavity means; and, at least a pair of spring biased spherical shaped means, said spherical shaped means being positioned so that one of said spherical means sits at the bottom of a hollow defined by said tapered portion of said second reciprocable means second section when said tool is at rest so that its outmost surface coincides with the other surface of said first reciprocable means.

22. The hand tool of claim 21 wherein said tapered inner section is contoured so that said mode control means in response to being preconditioned by said shaft portion of said second reciprocable means results in said one of said spherical means being displaced radially within said radial cavity means by the longitudinal movement of said inner tapered section for said locking of said first reciprocable means onto said handle means.

23. The hand tool of claim 22 wherein for said locking, one of said ball means is positioned within said opening of said wall of said first reciprocable means adjacent to said radial cavity and said radial cavity means.

24. The hand tool of claim 21 wherein said mode control means in the absence of being preconditioned by said shaft portion, results in said one of said spherical means sits at said bottom of said hollow in said tapered inner section for said locking of said first and second reciprocable means together so that when moved longitudinally a front section of said handle member means slides said rings off said tool onto said devices.

25. The hand tool of claim 21 wherein a portion of said first reciprocable means includes an elongated horizontal slot and wherein said handle member means further includes:

second radial cavity means positioned opposite said first radial cavity means and set screw means having a cylindrical shaped point, said set screw means being positioned within said second cavity means to make contact with said slot so as to maintain proper positioning of said first reciprocable means relative to said first radial cavity means.

26. The hand tool of claim 21 wherein said shaft portion of said second reciprocable means has a predetermined width and length for ease of positioning anywhere inside said compression rings.

27. The hand tool of claim 21 wherein said cam shaped portion of said front section of said first reciprocable means has a predetermined width and length selected for retaining said rings installed on said tool.

28. The hand tool of claim 27 wherein said front section of said first reciprocable means has a wedge-shaped front edge for ease of installation of said rings on said tool.

29. The hand tool of claim 21 wherein said front section and said shaft portion of said first and second reciprocable means respectively have widths and lengths which have predetermined ratios to each other, said ratios being the size of defined by said compression rings being installed on said devices.

30. The hand tool of claim 13 wherein said front section, said shaft portion of said first and second reciprocable means and a front portion of said handle means are constructed to be removable for enabling said tool to be used for installing different size compression rings.

* * * * *